United States Patent [19]

Amano et al.

[11] Patent Number: 5,204,421
[45] Date of Patent: Apr. 20, 1993

[54] PROCESS FOR PREPARING VINYL CHLORIDE POLYMER IMPROVED IN PLASTICIZER TAKE-UP BY TWO-STAGE ADDITION OF DISPERSION STABILIZERS

[75] Inventors: Tadashi Amano, Kawasaki; Shigehiro Hoshida, Kamisu, both of Japan

[73] Assignee: Shin-Etsu Chemical Co., Ltd., Tokyo, Japan

[21] Appl. No.: 560,825

[22] Filed: Jul. 31, 1990

[30] Foreign Application Priority Data

Aug. 1, 1989 [JP] Japan ............... 1-199844

[51] Int. Cl.$^5$ ............... C08F 2/20
[52] U.S. Cl. ............... 526/200; 526/202
[58] Field of Search ............... 526/200, 202

[56] References Cited

U.S. PATENT DOCUMENTS 4,845,174 7/1989 Amano ............... 526/62
4,940,759 7/1990 Yang ............... 526/62

Primary Examiner—Christopher Henderson
Attorney, Agent, or Firm—Oblon, Spivak, McClelland, Maier & Neustadt

[57] ABSTRACT

A process for preparing a vinyl chloride polymer of the present invention comprises initiating suspension polymerization by suspending a vinyl chloride monomer in an aqueous medium in the presence of a first dispersion stabilizer and adding a second dispersion stabilizer at a specified time after the initiation of polymerization. Here, as the first dispersion stabilizer, (A) a partially saponified polyvinyl alcohol with a high saponification degree and (B) a hydroxypropylmethyl cellulose are used in combination, and as the second dispersion stabilizer, (C) a partially polyvinyl alcohol with a low saponification degree is used. According to the process, it is possible to prepare a vinyl chloride polymer with excellent characteristics such as plasticizer take-up, etc.

3 Claims, No Drawings

PROCESS FOR PREPARING VINYL CHLORIDE POLYMER IMPROVED IN PLASTICIZER TAKE-UP BY TWO-STAGE ADDITION OF DISPERSION STABILIZERS

BACKGROUND OF THE INVENTION

1. Field of the Invention

This invention relates to suspension polymerization of vinyl chloride, particularly to a process for preparing a vinyl chloride resin having a high porosity as well as good plasticizer take-up and capable of producing products with a very small number of fish eyes.

2. Description of the Prior Art

Polyvinyl chloride (PVC) is a useful resin having excellent physical properties, and a variety of PVC from rigid to soft types have been used.

Among them, for soft resins, various plasticizers are employed and therefore as one important characteristic PVC is required to have excellent plasticizer take-up. For improvement of plasticizer take-up, the particles of PVC must be made more porous.

There have been proposed a large number of methods for preparation of PVC excellent in plasticizer take-up in the prior art. For example, the method proposed in Japanese Pre-examination Patent Publication (KOKAI) No. 115890/1977 is a method for preparing a porous PVC, which comprises carrying out suspension polymerization of vinyl chloride in the presence of a partially saponified polyvinyl alcohol having a saponification degree of 37 to 70 mol % and a polymerization degree of 160 to 500.

The methods proposed in Japanese Pre-examination Patent Publication (KOKAI) Nos. 14607/1982 and 229907/1985 are intended to obtain a porous PVC by starting the polymerization with the use of a surfactant or a polyvinyl alcohol with a low saponification degree as a dispersing agent, and adding a water-soluble dispersing agent when a predetermined polymerization conversion is attained.

According to these methods, PVC which is porous and excellent in plasticizer take-up to some extent can be obtained, but scale is liable to deposit in the polymerization vessel, and also when the amount of the vinyl chloride monomer is increased or the polymerization time is shortened, there is involved the problem that the polymer obtained will become coarse particles, or become a mass. Thus, they are not necessarily practical methods with high production efficiency. This is because, when a surfactant or a polyvinyl alcohol with a low saponification degree is used from the initial stage of polymerization, the skin layer on the surface of the polymer particles will be lost, whereby the suspension system becomes unstable.

SUMMARY OF THE INVENTION

Accordingly, an object of the present invention is to provide a process which can prepare a vinyl chloride polymer which is high in porosity, excellent in plasticizer take-up and capable of producing products with a very small number of fish eyes at high production efficiency.

More specifically, in accordance with the present invention, there is provided a process for preparing a vinyl chloride polymer, which comprises the steps of initiating suspension polymerization by suspending a monomer comprising vinyl chloride monomer and an oil-soluble polymerization initiator in the presence of a first dispersion stabilizer in an aqueous medium, and adding a second dispersion stabilizer in the polymerization system after initiation of the suspension polymerization, wherein said first dispersion stabilizer comprises (A) a partially saponified polyvinyl alcohol with an average polymerization degree of 1,500 to 2,700 and a saponification degree of 75 to 85 mol % and (B) a hydroxylpropylmethyl cellulose with a methoxy substitution degree of 26 to 30% by weight, a hydroxypropoxy substitution degree of 4 to 15% by weight and a viscosity in 2% aqueous solution at 20° C. of 5 to 4,000 cP, and said second dispersion stabilizer comprises (C) a partially saponified polyvinyl alcohol with an average polymerization degree of 150 to 600 and a saponification degree of 20 to 55 mol %, said second dispersion stabilizer being added into the polymerization system after initiation of polymerization at the time when the polymerization conversion has reached 5% to 50%.

According to the present invention, by initiating suspension polymerization in the presence of the first dispersion stabilizer as mentioned above and adding the second dispersion stabilizer at the time specified as above after the initiation of polymerization, it has become possible to prepare a vinyl chloride polymer, which is highly productive and excellent in characteristics such as plasticizer take-up, etc.

DETAILED DESCRIPTION OF THE INVENTION

First dispersion stabilizer

In the present invention, the first stabilizer first added in the polymerization system comprises the (A) partially saponified polyvinyl alcohol and the (B) hydroxypropylmethyl cellulose, as described above.

The partially saponified polyvinyl alcohol (A) has an average polymerization degree ranging from 1500 to 2700, and a saponification degree ranging from 75 to 85 mol %, and this is used in an amount of 0.02 to 0.08 part by weight per 100 parts by weight of the charged monomer.

If the partially saponified polyvinyl alcohol (A) has an average molecular weight lower than 1,500, or a saponification degree lower than 75 mol %, the suspension system becomes unstable, whereby the polymer obtained becomes coarse particles, or scale may deposit in the polymerization vessel.

If the average polymerization degree is higher than 2,700, or the saponification degree exceeds 85 mol %, plasticizer take-up, the number of fish eyes will increase.

The hydroxypropylmethyl cellulose (B) has a methoxy substitution degree of 26 to 30% by weight, a hydroxypropoxy substitution degree of 4 to 15% by weight and a viscosity in 2% aqueous solution at 20° C. of from 5 to 4,000 cP, and this is used in an amount of 0.02 to 0.08 part by weight per 100 parts by weight of the charged monomer.

If the methoxy substitution degree is lower than 26% by weight, or the hydroxypropoxy substitution degree is lower than 4% by weight, plasticizer take-up will be lowered. If the methoxy substitution degree is higher than 30% by weight, or the hydroxypropoxy substitution degree exceeds 15% by weight, the particle size distribution of the polymer particles obtained will become undesirably broad.

The partially saponified polyvinyl alcohol (A) and the hydroxypropylmethyl cellulose (B) may be added at the same time in the form of, for example, a mixed solution, or alternatively separately from each other.

According to the present invention, suspension polymerization is carried in a polymerization system in which the monomer comprising vinyl chloride monomer and the oil-soluble polymerization initiator are suspended in an aqueous medium by the first dispersion stabilizer added as described above.

Second dispersion stabilizer

According to the present invention, after the initiation of polymerization, at the point when the polymerization conversion reaches 5 to 50%, preferably 10 to 30%, the second dispersion stabilizer, the (C) partially saponified polyvinyl alcohol with a low saponification degree, is added.

The polymerization conversion can be estimated substantially accurately from the polymerization time.

If the partially saponified polyvinyl alcohol (C) is added before the polymerization conversion reaches 5%, the particle size of the PVC obtained becomes undesirably fine. On the other hand, if it is added at the point when the polymerization conversion exceeds 50%, the effect of improvement in plasticizer take-up will be low.

The partially saponified polyvinyl alcohol with a low saponification degree (C) is required to have an average polymerization degree ranging from 150 to 600, preferably from 200 to 300, and a saponification degree ranging from 20 to 55 mol %. If the average polymerization degree is lower than 150, or the saponification degree is smaller than 20 mol %, the polymer obtained becomes coarse particles, or polymer scale will be generated in the polymerization vessel. On the other hand, if the average polymerization is exceeds 600, or the saponification degree is higher than 55 mol %, the plasticizer takeup cannot be sufficiently improved.

The partially saponified polyvinyl alcohol with a low saponification degree (C) is added in an amount of 0.01 to 1 part by weight per 100 parts by weight of the charged monomer.

The method for adding the partially saponified polyvinyl alcohol with a low saponification degree (C) is not particularly limited, but, for example, it may be added directly as such, or as a solution using a solvent such as methanol, acetone, methyl acetate and ethyl acetate or a mixed solvent such as water/methanol, or as an aqueous emulsion.

Vinyl chloride monomer

The monomer comprising vinyl chloride monomer to be polymerized according to the process of the present invention may include, in addition to viny chloride alone, monomeric mixtures comprised of mainly vinyl chloride (generally 50% by weight or more of vinyl chloride) and relatively a small amount of a monomer copolymerizable with the vinyl chloride. As the comonomer to be copolymerized with the vinyl chloride, there may be exemplified vinyl esters such as vinyl acetate, vinyl propionate and the like; acrylates such as methyl acrylate, ethyl acrylate and the like, and corresponding methacrylates; olefins such as ethylene, propylene, etc.; maleic anhydride; acrylonitrile; styrene; vinylidene and other monomers copolymerizable with vinyl chloride.

Oil-soluble polymerization initiator

Examples of oil-soluble polymerization initiators to be used in the present invention may include percarbonate compounds such as diisopropyl peroxodicarbonate, di-2-ethylhexyl peroxodicarbonate, diethoxyethyl peroxodicarbonate, etc.; perester compounds such as t-butyl peroxyneodecanate, α-cumyl peroxyneodecanate, t-butyl peroxyneodecanate, etc.; peroxides such as acetylcyclohexylsulfonyl peroxide; 2,4,4-trimethylpentyl-2-peroxyphenoxyacetate, etc.; azo compounds such as azobis-2,4-dimethylvaleronitrile, azobis-(4-methoxy-2,4-dimethylvaleronitrile), etc.; further potassium persulfate, ammonium persulfate, hydrogen peroxide, etc. These can be used either singly or in combination of two or more.

Polymerization conditions

The process for preparing the vinyl chloride polymer of the present invention is practiced under the conditions known per se except for using the first dispersion stabilizer as described above and adding the specific second dispersion stabilizer at the time as specified above.

For example, the amount of the aqueous medium used and the amount of the polymerization initiator used per monomer, and the polymerization temperature, etc. may be within the ranges employed in the prior art. Also, if necessary, polymerization regulators, pH controllers, etc. can be added, and a small amount of surfactant can be also added depending on the purpose.

EXAMPLES

Example 1

In an autoclave of 100-liter inner volume was charged 50 kg of pure water, and (A) 20 g of partially saponified polyvinyl alcohol with a polymerization degree of 2,550 and a saponification degree of 80 mol % and (B) 20 g of a hydroxypropylmethyl cellulose with a methoxy substitution degree of 29% by weight, a hydroxypropoxy substitution degree of 10% by weight and a viscosity in 2% by weight aqueous solution at 20° C. of 50 cP, and further 24 g of di-2-ethylhexyl peroxodicarbonate as a polymerization initiator were charged, followed by degassing to an autoclave inner pressure of −700 mmHg.

After degassing, 40 kg of vinyl chloride monomer was charged, and polymerization was initiated at 57° C. while the temperature was elevated.

When the polymerization conversion reached 10%, (C) 40 g of a partially saponified polyvinyl alcohol with a polymerization degree of 235 and a saponification degree of 48 mol % was dissolved in water/methanol and pressurized into the polymerization vessel.

The reaction was terminated when the inner pressure fell to 6.0 kg/cm$^2$G, then unreacted monomers were recovered, followed by dehydration and drying to obtain a polymer.

In this case, no scale deposited at all on the wall of the polymerization vessel.

Also, for the polymer obtained, bulk specific gravity, particle size distribution, amount and time of take-up of plasticizer, numbers of fish eye were measured. The results are shown in Table 1.

The amount of take-up of plasticizer, the time of take-up, and the member of fish eyes were measured according to the following methods.

Plasticizer take-up amount

Grass fibers were packed at the bottom of a vessel made of an aluminum alloy with an inner diameter of 25 mm and a depth of 85 mm, and 10 g of a sample resin was sampled and placed therein.

To this was added 15 cc of dioctyl phthalate (DOP), and the mixture was left to stand for 30 minutes to have DOP sufficiently permeated into the resin.

Then, excessive DOP is centrifuged at an acceleration of 1,500 G, and the amount of DOP absorbed in the resin was determined as a value per 100 parts by weight of the resin.

Plasticizer take-up time

In a plastograph (planetary mixer) was placed 400 g of polymer powder, and preheated (4 minutes) under stirring at 60 rpm to 80° C., and 200 g of DOP was added thereto. The time from its addition to the point when the torque dropped was defined as the plasticizer take-up time.

Fish eye

A compound (25 g) comprising a mixture of 100 parts by weight of sample resin, 1 part by weight of tribasic lead sulfate, 1.5 parts by weight of lead stearate, 0.2 part by weight of titanium dioxide, 0.1 part by weight of carbon black, and 50 parts by weight of DOP was kneaded on rolls of 145° C. for 5 minutes, and a sheet with a thickness of 0.2 mm was separated. The number of transparent particles within 100 cm² of the sheet was indicated as the number of fish eyes.

Example 2

The same procedure as in Example 1 was followed except that the (C) partially saponified polyvinyl alcohol with the polymerization degree of 235 and the saponification degree of 48 mol % was pressurized into the polymerization at the point of the polymerization conversion of 30%.

The measurement results for the polymer obtained are shown in Table 1.

Example 3

The same procedure as in Example 1 was followed except that the amount of the (C) partially saponified polyvinyl alcohol with the polymerization degree of 235 and the saponification degree of 48 mol % added was changed to 80 g, to obtain a polymer.

The measurement results for the polymer obtained are shown in Table 1.

COMPARATIVE EXAMPLE 1

The same procedure as in Example 1 was followed except that no partially saponified polyvinyl alcohol (C) was added, to obtain a polymer.

The measurement results for the polymer obtained are shown in Table 1.

COMPARATIVE EXAMPLE 2

The same procedure as in Example 1 was followed except that the partially saponified polyvinyl alcohol (C) was charged simultaneously with (A) and (B) before the initiation of polymerization, to obtain a polymer.

The measurement results for the polymer obtained are shown in Table 1.

In this case, scale was found to deposit on the whole wall of the polymerization vessel.

COMPARATIVE EXAMPLE 3

The same procedure as in Example 1 was followed except that the partially saponified polyvinyl alcohol (C) was pressurized at the point when the polymerization conversion was 65%, to obtain a polymer.

The measurement results for the polymer obtained are shown in Table 1.

TABLE 1

|  | Example 1 | Example 2 | Example 3 | Comparative[*1] Example 1 | Comparative Example 2 | Comparative Example 3 |
| --- | --- | --- | --- | --- | --- | --- |
| Bulk specific gravity | 0.480 | 0.492 | 0.472 | 0.502 | 0.385 | 0.498 |
| Particle size[*2] distribution |  |  |  |  |  |  |
| 60 mesh | 100 | 100 | 100 | 100 | 97.2 | 100 |
| 80 mesh | 65.0 | 59.7 | 85.0 | 58.3 | 90.5 | 56.2 |
| 100 mesh | 42.1 | 35.5 | 50.1 | 35.4 | 81.4 | 35.1 |
| 150 mesh | 9.0 | 7.9 | 10.2 | 7.2 | 70.6 | 7.0 |
| 200 mesh | 2.3 | 1.8 | 3.5 | 1.6 | 50.3 | 1.5 |
| Plasticizer take-up amount | 42.0 | 41.2 | 45.0 | 20.5 | 40.1 | 21.3 |
| Plasticizer take-up time | 9.2 | 9.8 | 8.9 | 21.0 | 10.5 | 20.2 |
| Fish eye | 0 | 0 | 0 | 30 | 20 | 29 |

Remarks
[*1]Scale deposited on the whole wall of the polymerization vessel, and coarse particles mixed.
[*2]Undersize distribution; Sieve defined by JIS Z-8801

We claim:

1. A process for preparing a vinyl chloride polymer, which comprises the steps of initiating suspension polymerization by suspending a monomer comprising vinyl chloride monomer and an oil-soluble polymerization initiator in the presence of a first dispersion stabilizer in an aqueous medium, and adding a second dispersion stabilizer in the polymerization system after initiation of the suspension polymerization, wherein said first dispersion stabilizer comprises (A) a partially saponified polyvinyl alcohol with an average polymerization degree of 1,500 to 2,700 and a saponification degree of 75 to 85 mol% and (B) a hydroxylpropylmethyl cellulose with a methoxy substitution degree of 26 to 30% by weight, a hydroxypropoxy substitution degree of 4 to 15% by weight and a viscosity in 2% aqueous solution at 20° C. of 5 to 4,000 cP, and said second dispersion stabilizer comprises (C) a partially saponified polyvinyl alcohol with an average polymerization degree of 150 to 600 and a saponification degree of 20 to 55 mol%, said second dispersion stabilizer being added into the polymerization system after initiation of polymerization at the time when the polymerization conversion has reached 5% to 50%, wherein the partially saponified polyvinyl alcohol (A) is added in an amount of 0.02 to 0.08 part by weight per 100 parts by weight of the charged monomer, wherein the hydroxypropyl methylcellulose (B) is added in an amount of 0.02 to 0.08 parts by weight per 100 parts by weight of the charged monomer, and wherein the partially saponified polyvinyl alcohol (C) is added in an amount of 0.01 to 1 part by weight per 100 parts by weight of the charged monomer.

2. A process according to claim 1, wherein the partially saponified polyvinyl alcohol (C) is added when the polymerization conversion has reached 10 to 30%.

3. A process according to claim 1, wherein the partially saponified polyvinyl alcohol (C) has an average polymerization degree in the range from 200 to 300.

* * * * *